United States Patent [19]

Dean et al.

[11] Patent Number: 5,446,853
[45] Date of Patent: Aug. 29, 1995

[54] SYSTEM FOR BUFFERING TRACK IMAGE AT EACH READ/WRITE HEAD IN A DISK DRIVE UNIT HAVING MULTIPLE READ/WRITE HEADS

[75] Inventors: Robert E. Dean, Boulder; Steven C. Cacka, Longmont; Douglas P. Schaefer, Lafayette; Hossein F. Sevvom, Boulder; Robert A. Brumnet, Denver, all of Colo.

[73] Assignee: Storage Technology Corporation, Louisville, Colo.

[21] Appl. No.: 622,922

[22] Filed: Jan. 18, 1991

Related U.S. Application Data

[63] Continuation of Ser. No. 304,788, Jan. 31, 1989, abandoned.

[51] Int. Cl.6 .............................. G06F 13/00
[52] U.S. Cl. .................... 395/410; 364/DIG. 1;
364/DIG. 2; 364/236.2; 364/238.6; 364/243;
364/243.4; 364/243.41; 364/248.1; 364/926.1;
364/926.2; 364/939; 364/939.3; 364/952;
364/952.1; 364/964; 364/964.2; 364/964.32;
364/964.3
[58] Field of Search .................. 364/DIG. 1, DIG. 2;
395/800, 250, 275, 600, 700

[56] References Cited

U.S. PATENT DOCUMENTS

| | | | |
|---|---|---|---|
| 3,732,546 | 5/1973 | Ronkin et al. | 395/425 |
| 4,524,399 | 6/1985 | Jepsen | 360/97 |
| 4,821,165 | 5/1989 | Gunn | 363/60 |
| 4,868,734 | 9/1989 | Idleman et al. | 364/DIG. 1 |

Primary Examiner—Robert B. Harrell
Attorney, Agent, or Firm—Duft, Graziano & Forest

[57] ABSTRACT

A track image read/write head buffer provides a buffer memory for each read/write head in the rotating media data storage system so that a seek request from the processor can be handled as soon as the beginning of the requested data record is positioned below the associated read/write head. The data image of the entire data storage track that contains the requested data record stored on the rotating media is read from the rotating media by the read/write head and stored in the track image read/write head buffer independent of the availability of a data communication path to the processor. Thus, the read data operation need not be synchronized with the availability of a data communication path to the processor and the requested data record is retrieved from the rotating media as soon as the data record is properly positioned. In no case is the data retrieval time greater than one revolution of the rotating media. The error correction codes written on the rotating media to protect the integrity of the requested data are maintained since they are stored in the read/write head buffer along with the data record.

27 Claims, 3 Drawing Sheets

SYSTEM FOR BUFFERING TRACK IMAGE AT EACH READ/WRITE HEAD IN A DISK DRIVE UNIT HAVING MULTIPLE READ/WRITE HEADS

This is a continuation of application Ser. No. 07/304,788, filed Jan. 31, 1989, now abandoned.

CROSS REFERENCE TO RELATED APPLICATIONS

This application is related to application Ser. No. 07/304,622, U.S. Pat. No. 5,155,811, issued Oct. 13, 1992 entitled Read/Write Head Buffer and application Ser. No. 07/778,301 entitled Address Mark Triggered Read/Write Head Buffer, now U.S. Pat. No. 5,341,479 both filed on the same date as this application.

FIELD OF THE INVENTION

This invention relates to data storage systems and, in particular, to a data buffer that is used in a rotating media data storage system to improve the data transfer performance of the data storage system.

PROBLEM

It is a problem in the field of data storage systems to minimize the data retrieval time when reading a data record from a data storage system. In disk drive memory systems for example, a processor is typically connected by a channel interface unit to a plurality of data channels. Each data channel is connected to one or more Direct Access Storage Device (DASD) units which function to store large quantities of data. Each DASD unit includes a control unit for interfacing with the data channel that typically carries eight bit parallel data in a byte serial decoded input/output record format. The control unit performs a data management function to maintain records of the location of all the data stored in the DASD unit. The DASD unit includes rotating data storage media consisting of a plurality of disks, each of which has associated therewith one or more moveable read/write heads. The data is stored on the rotating media in a track format that consists of a plurality of concentric rings of data. A control module is also included at the head of a string of disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

In a data record read operation, the processor transmits a seek request, through the channel interface unit and an available data channel, to the DASD control unit associated with the rotating media on which the requested data record is stored. The processor, upon completion of the transmission of the seek request, returns to processing other tasks. The DASD control unit responds to the seek request by determining the physical location of the requested data record on the plurality of disks. The control unit transmits information to the associated control module identifying the physical location and size of the data record in order to retrieve the requested data record from one of the disks of the rotating media. Since the data record is stored in a track format on a rotating media, the actuator associated with the identified disk of the rotating media on which the requested data record is stored must wait until the rotating media rotates a sufficient distance to present the beginning of the requested data record underneath the read/write head associated with the actuator.

A predetermined time before the beginning of the requested data record reaches the read/write head associated with the actuator, the control module requests the control unit to obtain a data communication path to the processor in order to transmit the retrieved data record from the rotating media directly to the processor over this data communication path. If a data communication path to the processor is not available, the control module must wait for one entire revolution of the rotating media before the media is again in the position where the requested data record is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system, where there are a multitude of random data seeks, such delays can unnecessarily tie up actuators in the disk drive unit and significantly increase the system response time.

SOLUTION

The above described problems are solved and a technical advance achieved in the field by the track image read/write head buffer that improves data transfer performance in a rotating media data storage system by rendering the data read operation at the read/write head independent of the control module, control unit and the availability of the data communication path from the control unit to the processor. This is accomplished by providing a buffer memory for each read/write head in the rotating media data storage system so that a seek request from the processor can be handled as soon as the beginning of the requested data record is positioned below the read/write head of the associated actuator. The entire track on the rotating media that includes the requested data record is read from the rotating media by the read/write head and stored in the track image read/write head buffer independent of the availability of a data communication path to the processor. Thus, the read data record operation need not be synchronized with the availability of a data communication path to the processor. In addition, there is a high probability that successive data record read operations will request data records from the same data storage track on the rotating media as contained the requested data record. This is because program instructions are generally sequentially executed and are also stored in memory in this sequential order. Thus, by storing an entire track image in the buffer, the data record read response time can be improved by using the buffer as a mini-cache memory.

The data record read by the read/write head is stored in the read/write head buffer in two, seven run length limited (RLL) self clocking code format with the error correction code bits appended to the data record. The track image read/write head buffer does not process the track image read from the rotating media but instead stores this track image for subsequent deformatting and processing by the control module. The read/write head buffer includes a phase locked loop to maintain signal clocking independent of the control module. By providing the read/write head buffer on a one per actuator basis, the response time of the rotating media data storage system for a memory access is significantly reduced since the requested data record is retrieved from the rotating media as soon as the data record is properly positioned and in no case will this time be greater than one revolution of the rotating media. In addition, the storage of an entire track image in the track image read/write head buffer speeds up the data record retrieval time for subsequently requested data records, as mentioned above.

The error correction codes written on the rotating media to protect the integrity of the requested data record are maintained since they are stored in the read/write head buffer along with the data record. Thus, once a data communication path is established to the processor, the control module receives the image that was stored on the rotating media from the read/write head buffer and can deformat this data from the bit serial, two, seven run length limited self clocking coding with error correction characters format of this data and convert this information to eight bit parallel data that is in an input/output record format for use by the control unit. The control unit stores the decoded error checked data record and transmits the requested data record to the processor over the available data channel if a full track buffer is present in the cache. If the cache is not equipped with a full track buffer, only the count and key records are buffered. In this fashion, the read/write head buffer enables the processor to effectively "start" and "stop" the rotating media to obtain data stored thereon. While the rotation of the rotating media is not interrupted, the use of the track image read/write head buffer enables the processor both to have access to a data record independent of the operation of the rotating media and to have the remainder of the data storage track cached in the track image read/write head buffer.

DETAILED DESCRIPTION

Figure 1:
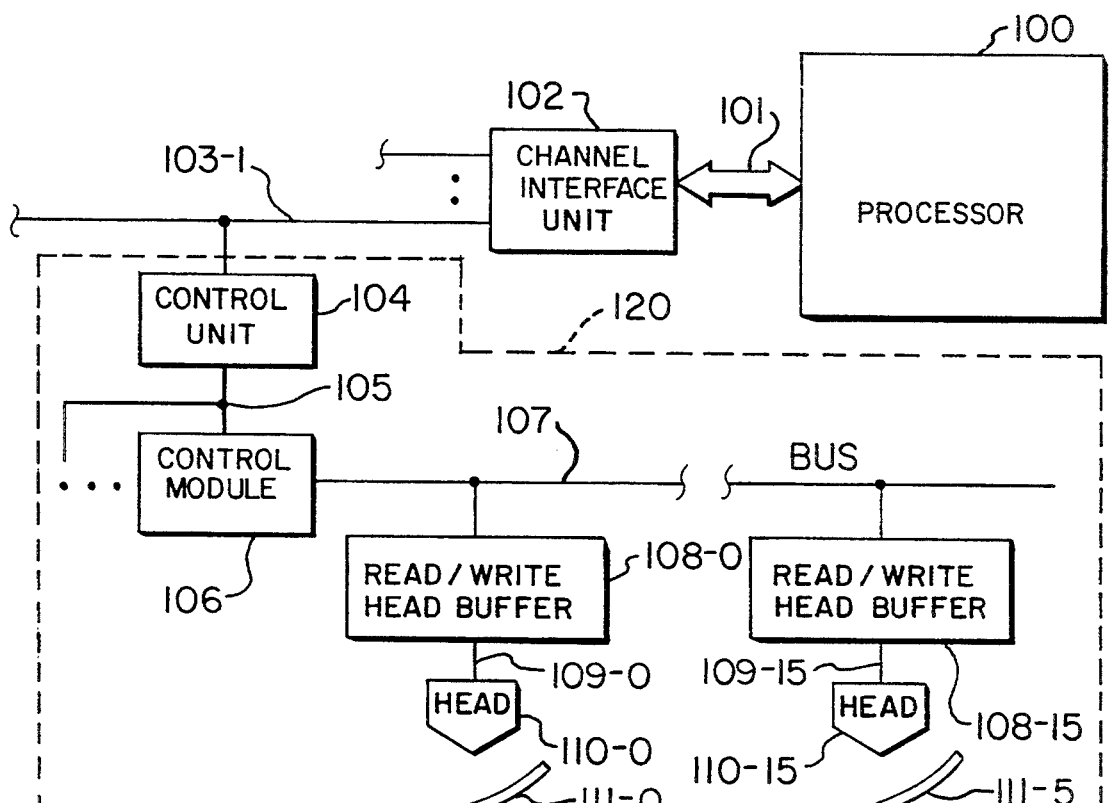
FIG. 1 illustrates the overall architecture of the read/write head buffer as placed in a data processing environment.

In computer systems, a processor is typically connected by a channel interface unit to a plurality of data channels. Each data channel is connected to one or more Direct Access Storage Device (DASD) units which function to store large quantities of data. These DASD units typically use rotating data storage media comprised of either optical disks or magnetic disks to store data records thereon.

A typical DASD unit is the IBM 3380-type disk drive unit that uses magnetically readable/writable disks as the data storage media. Each of these 3380-type DASD units includes a control unit for interfacing with a data channel to the processor that typically carries eight bit parallel data in a byte serial decoded input/output record format. The control unit performs a data management function to maintain records of the physical location of all the data stored on the DASD unit. The DASD unit includes rotating data storage media typically consisting of a plurality of magnetically readable/writable disks, each of which has associated therewith one or more moveable read/write heads. The data is stored on the rotating media in a track format that consists of a plurality of concentric rings of data. A control module is also included at the head of a string disk drive units and connected to the control unit to convert between the eight bit parallel data format of the data channel and the bit serial data format of the rotating media. In addition, the control module controls data formatting and error correction code generation. The control module is connected by way of a bus to a plurality of read/write heads attached to an actuator, each of which serves to read and write data on an associated disk of the rotating media.

Data Record Read Operation

In a data record read operation, the processor transmits a seek request, through the channel interface unit and an available data channel, to the DASD control unit associated with the rotating media on which the requested data record is stored. The processor, upon completion of the transmission of the seek request, returns to processing other tasks. The DASD control unit responds to the seek request by determining the physical location of the requested data record on the plurality of disks. The control unit transmits information to the associated control module identifying the physical location and size of the data record in order to retrieve the requested data record from one of the disks of the rotating media. Since the data record is stored in a track format on a rotating media, the actuator associated with the identified disk of the rotating media on which the requested data record is stored must wait until the rotating media rotates a sufficient distance to present the beginning of the requested data record underneath the read/write head associated with the actuator.

A predetermined time before the beginning of the requested data record reaches the read/write head associated with the actuator, the control module requests the control unit to obtain a data communication path to the processor in order to transmit the retrieved data record from the rotating media directly to the processor over this data communication path. If a data communication path to the processor is not available, the control module must wait for one entire revolution of the rotating media before the media is again in the position where the requested data record is a sufficient distance away from the read/write head to establish a data communication path to the processor. This process is repeated until a data communication path to the processor is available and the data, as read by the read/write head, can be transmitted directly via the control module and control unit and an available data channel to the processor. It is obvious that there can be numerous delays in this data storage system while data communication paths are established. In a transaction based system where there are a multitude of random data seeks, such delays can unnecessarily tie up actuators in the disk drive unit and significantly increase the system response time.

The track image read/write head buffer improves data transfer performance in a rotating media data storage system by rendering the data read operation at the read/write head independent of the control module, control unit and the availability of the data communication path from the control unit to the processor. This is accomplished by providing a buffer memory for each read/write head in the rotating media data storage system so that a seek request from the processor can be handled as soon as the beginning of the requested data record is positioned below the read/write head of the associated actuator. The entire track on the rotating media that includes the requested data record is read from the rotating media by the read/write head and stored in the track image read/write head buffer independent of the availability of a data communication path to the processor. Thus, the read data record operation need not be synchronized with the availability of a data communication path to the processor. In addition, there is a high probability that successive data record read operations will request data records from the same data storage track on the rotating media as contained the requested data record. This is because program instructions are generally sequentially executed and are also stored in memory in this sequential order. Thus, by storing an entire track image in the buffer, the data record read response time can be improved by using the buffer as a mini-cache memory.

The data record read by the read/write head is stored in the read/write head buffer in run length limited self clocking code format (such as 2, 7 coding) with the error correction code bits appended to the data record. The track image read/write head buffer does not process the track image read from the rotating media but instead temporarily stores this track image for subsequent deformatting and processing by the control module. The read/write head buffer includes a phase locked loop to maintain signal clocking independent of the control module. By providing the read/write head buffer on a one per actuator basis, the response time of the rotating media data storage system for a memory access is significantly reduced since the requested data record is retrieved from the rotating media as soon as the data record is properly positioned and in no case will this time be greater than one revolution of the rotating media. In addition, caching the entire data storage track that contains the requested data record speeds up the data retrieval time for subsequently requested data records, as mentioned above.

The error correction codes written on the rotating media to protect the integrity of the requested data record are maintained since they are stored in the read/write head buffer along with the data record. Thus, once a data communication path is established to the processor, the control module receives the image that was stored on the rotating media from the read/write head buffer and can deformat this data from the bit serial, run length limited self clocking (ex. two, seven) coding with error correction characters format of this data and convert this information to eight bit parallel data that is in an input/output record format for use by the control unit. The control unit stores the decoded error checked data record and transmits the requested data record to the processor over the available data channel. In this fashion, the read/write head buffer enables the processor to effectively "start" and "stop" the rotating media to obtain data stored thereon. While the rotation of the rotating media is not interrupted, the use of the track image read/write head buffer enables the processor both to have access to a data record independent of the operation of the rotating media and to have the remainder of the data storage track cached in the track image read/write head buffer.

System Architecture

FIG. 1 illustrates the overall architecture of a data processing system that is equipped with an associated data storage system that includes a plurality of memory devices, one of which is illustrated in FIG. 1 in the form of a conventional 3380-type of disk drive unit 120. Processor 100 is connected via bus 101 to a channel interface unit 102 that serves to interconnect processor 100 with a plurality of data channels 103-1 to 103-n, each of which is an eight bit parallel data bus. Connected to one of these data channels 103-1 is the disk drive unit 120 mentioned above.

Disk drive unit 120 includes a control unit 104 that functions to provide overall management of the disk drive unit 120. This management function includes storing information that identifies the exact physical location of all data stored on the rotating media 111-0 to 111-15 of disk drive unit 120. Processor 100 identifies a data record by volume identification and address. While this information provides a general physical location of the data, the exact storage location on the rotating media 111-0 to 111-15 requires additional specificity. Control unit 104 provides this additional specific information by converting the volume and address information received from the processor into head, actuator, track and sector identification information to precisely define the physical location of the requested data record on disk drive unit 120.

The control unit 104 transfers data between data channel 103-1 and one or more control modules (ex. 106) in an eight bit parallel data format wherein each eight bits of data comprise one of a series of bits of the data record in a decoded input/output record format. The data in this format is converted by control module 106 into a bit serial format wherein error correction code characters are appended thereto for error detection and control purposes. The resultant data is then encoded into two, seven code. The control module 106 responds to the control signals transmitted by control unit 104 identifying the head, actuator, track and sector for storing a data record by selecting one of the actuators 110-0 to 110-15 that are used by disk drive unit 120 to read/write data on the rotating media 111-0 to 111-15. While sixteen actuators are illustrated herein, it is expected that future devices may be equipped with 32 or more actuators. The actuators include the read/write head and signal control circuitry for reading and writing the data on the rotating media 111-0 to 111-15.

The above-described conventional disk drive unit 120 of FIG. 1 is also equipped with a plurality of track image read/write head buffers 108-0 to 108-15 on a one per read/write head basis. The track image read/write head buffer 108-0, for or example, is interposed between bus 107 and read/write head 110-0. The exact physical implementation of this track image read/write head buffer can also be a single memory connected to bus 107 and partitioned into segments, one segment for each read/write head 108 in disk drive unit 120. Track image read/write head buffer 108-0 serves to temporarily store the entire data storage track image captured by the read/write head 110-0.

Track Image Read/Write Head Buffer Circuit

Figure 2:
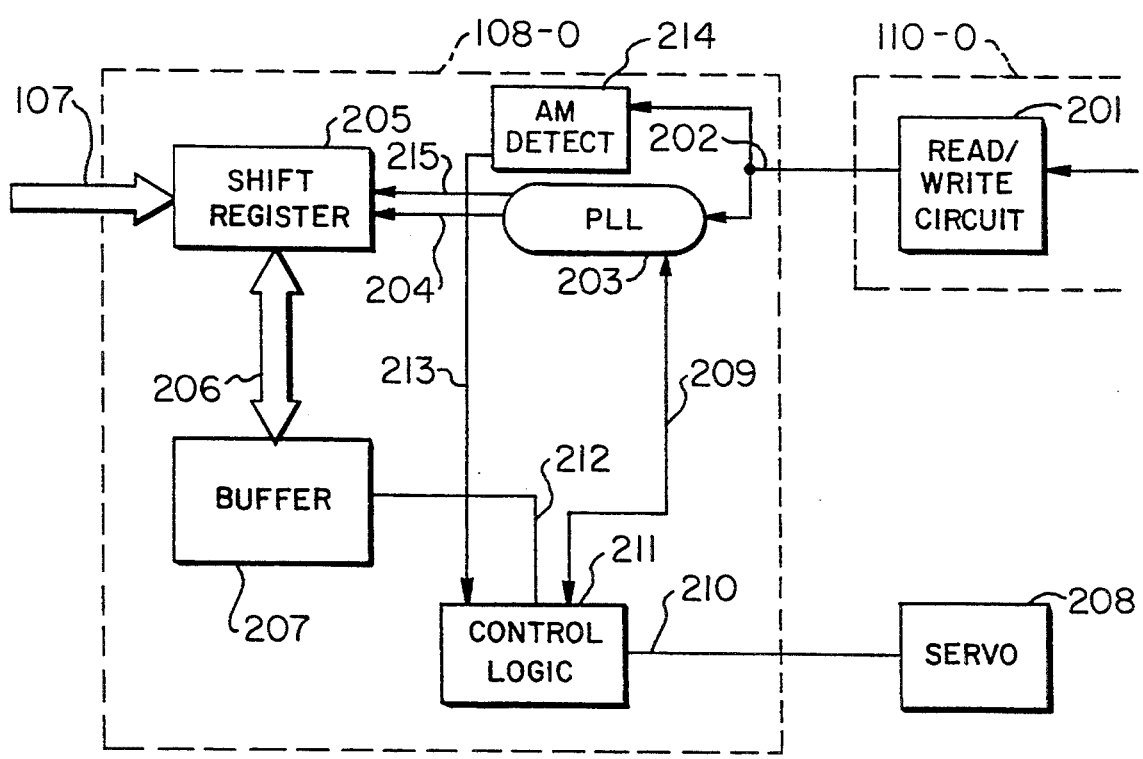
FIG. 2 illustrates additional circuit details of the read/write head buffer.

FIG. 2 illustrates additional detail of track image read/write head buffer 108-0. Data is read in analog form by read/write circuit 201 of read/write head 110-0 and converted into a digital signal that is typically self clocked. The digital data signal is transmitted by read/write circuit 201 on lead 202 to track image read/write head buffer 108-0 where it is applied to phase locked loop 203 and address mark detect circuit 214. The address mark detect circuit 214 monitors the digital data signal to identify the presence of an address mark (AM) that precedes the count field in each data record stored on the media 111-0. The clock and data signals on leads 204 and 215 enable shift register 205 to receive the serial bits of data and store these data bits in its memory. Each 16 bit byte of 2, 7 encoded data that is stored in shift register 205 is transmitted over bus 206 in parallel form to buffer 207. The addressing of buffer 207 is accomplished by the use of the disk drive servo 208 which identifies the sector count of the rotating media in well-known fashion and outputs this information on lead 210 to control logic 211. The sector count is converted by control logic 211 to a pointer value that is output on lead 212 to address buffer 207. The clock signal from phase locked loop 203 is used to maintain clock timing synchronization to load data into buffer 207. Thus, the digital data signal that is read from the rotating media is maintained in the proper clocking synchronization by the use of phase locked loop 203 so that the data stored via shift register 205 in buffer 207 accurately represents the data stored on the track of the rotating media 111-0.

The accuracy of this data stored in buffer 207 is insured because this data along with its associated error correction code bits is stored in a two, seven code format. The image of the entire data storage track is thereby temporarily stored in buffer 207 for transmission to control module 106 via shift register 205 and bus 107. Track image read/write head buffer 108-0 therefore appears transparent to control module 106 in that the output of track image read/write head buffer 108-0 is identical to the signal output by read/write head 110-0 except for its lack of synchronization with the rotating media 111-0. Control module 106 resynchronizes the data obtained from track image read/write head buffer 108-0, therefore any data storage errors occasioned by track image read/write head buffer 108-0 due to defects in the rotating media 111-0 or address marks are easily corrected by control module 106 by use of its own internal phase locked loop and error correction circuitry. Maintenance of the error correction codes through track image read/write head buffer 108-0 minimizes the possibility of an error occurring in the data transfer process.

Track Data Image

Figure 3:
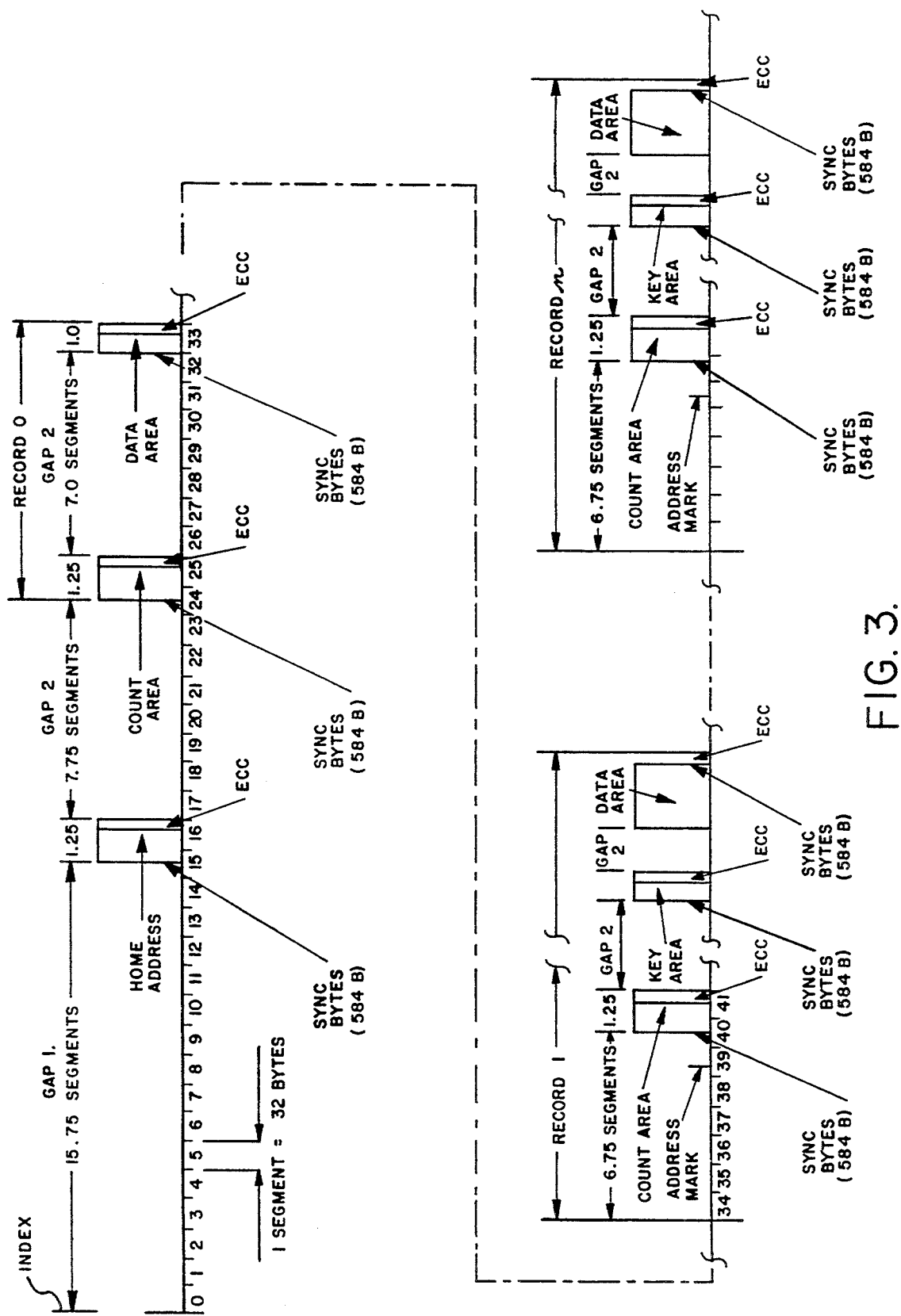
FIG. 3 illustrates the format of the data storage track.
Figure 4:
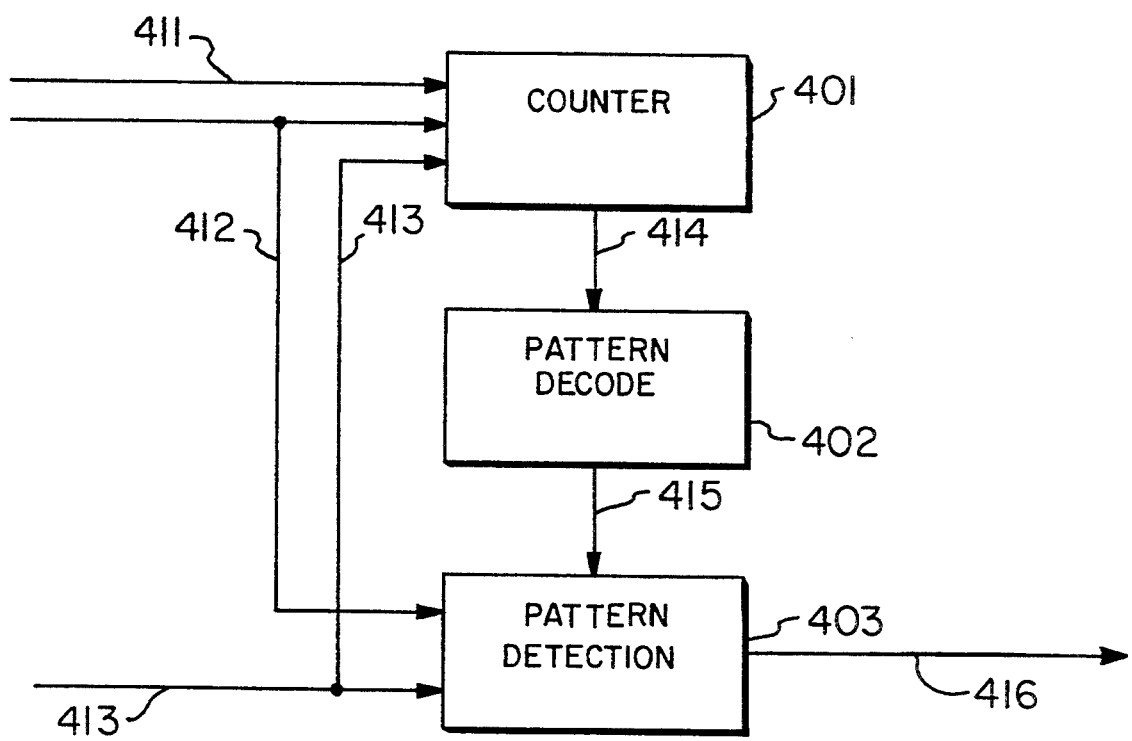
FIG. 4 illustrates the circuitry used for address mark triggering.

The format of a typical data storage track is illustrated in FIG. 3. This format is the standard count key data format well known in the field of data storage systems. The data storage track consists of a plurality of data records (Record 0, Record 1,...Record N) that are concatenated together to form a continuous string of data. Each data record (Record 0) contains the actual data, to which has been prepended count and key fields that are control information indicative of the size of the data field. The count, key and data fields are separated from each other by gap fields of predetermined length. Each gap field contains a predetermined sequence of 1s and 0s indicative of a particular gap field. This enables the control module 106 to simply determine the location of the count, key and data fields. Also included in the gap field that precedes the count field is an address mark (AM) that is also used by the control module 106 to locate the beginning of the data field. The address mark (AM) is located a predetermined distance (number of bits) in advance of the data field in the data record (Record 0).

Control module 106, in response to a data record retrieval request from processor 100, as translated into a head/actuator/track/sector identifier by control unit 104, monitors the data read by the designated read/write head from the selected data storage track. Control module 106 senses the gaps, address mark and count-/key fields in each data record. Upon the positioning of the requested data record under the read/write head, control module 106 enables the associated track image read/write head buffer (ex 108-0) to store the track image of the requested data record as well as the remaining N-1 data records written onto this data storage track. Control module 106 signals control unit 104 once the requested data record is stored in the associated track image read/write head buffer, 108-0. Once a data communication path is available from control unit 104 to processor 100 via one of data channels 103-1 to 103-n, control unit 104 retrieves the requested data record from control module 106 for transfer to processor 100. Track image read/write head buffer 108-0 concurrently transfers the requested data record to control module 106 while storing the remainder of the data storage track. As a matter of design choice, the track image can be stored beginning with the first data record that appears on the data storage track following the receipt of the data record retrieval request. The requested data record, when read from the data storage track, is then retrieved from track image read/write head buffer 108-0 by control module 106 for transmission to processor 100.

Direct Transfer Mode

In a certain percentage of read data record operations, the requested data record need not be buffered since a data communication path from the control unit 104 to processor 100 is available when the data record is read from the rotating media 111-0 to 111-15. In this case, the retrieval data record is read on a bitwise bias from the rotating media 111-0 to 111-15 by read/write circuit 201 and stored on a bytewise basis in shift register 205. The retrieved data record is then transmitted in parallel via bus 107 to control module 106. Once the requested data record is transmitted to control unit 104, the remainder of the data storage track is read from the rotating media 111-0 to 111-15 and stored in buffer 207 via shift register 205 for possible later use by processor 100. Buffer 207 is therefore switchably connected to bus 107 since it is used either to store the entire data storage track when the data communication path from the control unit 104 to processor 100 is unavailable at the time of reading the requested data record from the rotating media 111-0 to 111-15 or to store the remainder of the data storage track if the data communication path is available.

While a specific embodiment of the present invention has been disclosed, it is expected that those skilled in the art can and will devise alternate embodiments that fall within the scope of the appended claims.

I claim:

1. In a data processing system that includes a processor connected by at least one data channel to at least one control module, each control module being connected by a bus to a plurality of data storage devices, each of said data storage devices comprising:
 a plurality of read/write heads for accessing data from said rotating media on which data is stored in data tracks;
 a plurality of buffer means connected both to said bus and to said read/write heads, for storing the entire image of each of said data tracks read by one of said read/write heads from said rotating media; wherein each of said buffer means is connected to a single one of said read/write heads;

means, responsive to said processor transmitting a command to said control module requesting data stored on one of said data tracks on one of said data storage devices, for transferring said entire image of said one of said data tracks via one of said read/write heads directly into said buffer means.

2. The apparatus of claim 1 wherein said data tracks on said rotating media contain a plurality of data records, each having a beginning and an end, stored thereon, said transferring means including:

means for detecting the beginning of a first one of said plurality of data records that appears on said one of said data tracks subsequent to said processor transmitting said command; and means, responsive to said detecting means, for writing said entire image of said one of said data tracks on said rotating media into said buffer means, from a detected said beginning of said first one of said plurality of data records.

3. The apparatus of claim 2 wherein said control module establishes a data communication path from said control module to said processor to transfer said requested data to said processor, said transferring means further including:

means, responsive to said established data communication path from said control module to said processor, for excerpting said requested data from said one of said data tracks stored in said buffer means; and means for transmitting said excerpted requested data to said control module via said bus.

4. The apparatus of claim 3 wherein said excerpting means includes:

means responsive to said writing means for identifying the beginning of said requested data on said one track.

5. The apparatus of claim 4 wherein said excerpting means further includes:

means for transferring said requested data to said transmitting means.

6. In a data processing system that includes a processor connected by at least one data channel to at least one control module, each control module being connected by a bus to a plurality of rotating media data storage devices, each of said data storage devices having a plurality of read/write heads to access data stored on said rotating media on which data is stored in tracks, and having a plurality of buffers connected to said bus, each of which is connected to a single one of said read/write heads, a method to transfer data from said rotating media to said processor comprising the steps of:

reading, in response to said processor transmitting a command to said control module requesting a data record stored on one of said tracks of said rotating media, the entire image of said one track of said rotating media that contains said requested data record by one of said read/write heads; and writing said entire image of said one track into said buffer connected to one of said read/write heads.

7. The method of claim 6 wherein said tracks of said rotating media contain a plurality of data records, each having a beginning and an end, stored thereon, said step of writing includes the steps of:

detecting the beginning of a first one of said plurality of data records that appears on said one track of said rotating media that contains said requested data subsequent to said processor transmitting said command; and transferring the contents of said one track into said buffer.

8. The method of claim 7 wherein said step of excerpting includes the step of:

identifying the beginning of said requested data on said one track.

9. The method of claim 6, wherein said control module establishes a data communication path from said control module to said processor to transfer said requested data to said processor, further including the steps of:

excerpting, in response to said established data communication path from said control module to said processor, said requested data from said entire image of said one track stored in said buffer; and transmitting said excerpted requested data to said control module via said bus.

10. In a data processing system that includes a processor connected by at least one data channel to at least one control module, each control module being connected by a bus to a plurality of rotating media data storage devices, each of said data storage devices having a plurality of read/write heads for accessing data from said rotating media on which said data is stored in tracks, wherein said data storage device includes a plurality of buffers, each of which is connected to said bus and to a single one of said plurality of read/write heads of said data storage device, a method of transferring said data from said rotating media to said processor comprising the steps of:

writing, in response to said processor transmitting a command to said control module requesting said data stored on one of said tracks of one of said data storage devices, the entire image of said one track into said buffer connected to one of said read/write heads that reads said one track of said rotating media;

excerpting, in response to said control module establishing a data communication path from said control module to said processor, said data from said entire image of said one track stored in said buffer; and transmitting, in response to said established data communication path from said control module to said processor, said excerpted requested data to said control module via said bus.

11. The method of claim 10 wherein said tracks of said rotating media contain a plurality of data records, each having a beginning and an end, stored thereon, said step of writing includes the steps of:

detecting, in response to said command received by said control, the beginning of a data record on said one track of said data storage media that contains said requested data; and transferring the contents of said one track into said buffer from said detected beginning of said detected record.

12. The method of claim 11 wherein said step of excerpting includes the step of:

identifying the beginning of said requested data on said one track.

13. The method of claim 12 wherein said step of excerpting further includes the step of:

transferring said requested data to said transmitting means.

14. In a data processing system that includes a processor connected to a control module via a data channel, a plurality of data storage devices connected to said control module via a bus, each of said data storage devices comprising:
- a plurality of heads for accessing data from rotating media on which data is stored in tracks, said data storage devices being interconnected via a bus to said control module;
- a plurality of buffer means, each of which is connected to said bus and to a single one of said read/write heads for storing the entire contents of each of said tracks read by one of said read/write heads from said rotating media;
- means, responsive to said processor transmitting a command to said control module requesting data stored on one of said tracks of said data storage device, for writing to said processor the data on said one track that contains said requested data into said buffer means connected to the one of said read/write heads that reads said one track of said rotating media;
- means, responsive to said control module establishing a data communication path from said control module to said processor, for excerpting said requested data from said one track stored in said buffer means; and
- means for transmitting said excerpted requested data to said control module via said bus.

15. The apparatus of claim 14 wherein said excerpting means includes:
- means responsive to said transferring means for identifying the beginning of said requested data on said one track.

16. The apparatus of claim 15 wherein said excerpting means further includes:
- means for transferring said requested data to said transmitting means.

17. The apparatus of claim 14 wherein said tracks of said rotating media contain a plurality of data records, each having a beginning and an end, stored thereon, said writing means includes:
- means for detecting the beginning of a first one of said plurality of data records that appears on said one track subsequent to said processor transmitting said command; and
- means responsive to said detecting means for transferring the entire image of said one track into said buffer means.

18. In a data processing system that includes a processor, at least one data storage device interconnected with said processor via a control module and data channel, read/write head buffer apparatus for transferring data from said rotating media to said processor comprising:
- a plurality of read/write heads; bus means connected to and interconnecting said control module and said plurality of read/write heads for transferring data therebetween;
- a plurality of buffer means, each interposed between said bus means and one of said plurality of read/write heads for storing a data track read from said rotating media by one of said read/write heads; and
- means responsive to said processor transmitting a command to said control module requesting data stored on said data storage device for writing an entire image of the data track of said rotating media that contains requested said data into one of said buffer means connected to a specific one of said data storage device read/write heads that reads said data track.

19. The apparatus of claim 18 wherein said writing means includes:
- means, responsive to said control module establishing a data communication path from said control module to said processor, for excerpting said requested data from said image of said one track stored in said one buffer means; and
- means for transmitting said excerpted requested data to said control module via said bus means.

20. The apparatus of claim 19 wherein said excerpting means includes:
- means responsive to said transferring means for identifying the beginning of said requested data on said one track.

21. The apparatus of claim 20 wherein said excerpting means further includes:
- means for transferring said requested data to said transmitting means via said bus means.

22. The apparatus of claim 18 wherein said writing means includes:
- means for detecting the beginning of the first data record that appears on said one track of said data storage media that contains said requested data subsequent to said data request;
- means responsive to said detecting means for transferring the contents of said one track into said buffer means.

23. In a data processing system that includes a processor, at least one data storage device interconnected with said processor via a control module and data channel, read/write head buffer apparatus for transferring data from said rotating media to said processor comprising:
- a plurality of read/write heads; bus means connected to and interconnecting said control module and said plurality of read/write heads for transferring data therebetween;
- a plurality of buffer means, each of said buffer means connected to said bus means and to one of said plurality of read/write heads, for storing data track images read from said rotating media by said one of said plurality of read/write heads; and
- means responsive to said processor transmitting a command to said control module requesting data stored on said data storage device for writing one of said track images of said rotating media that contains requested said data into the one of said buffer means connected to the one of said plurality of read/write heads that reads said one of said track images of said rotating media.

24. The apparatus of claim 23 wherein said buffer means includes:
- a plurality of segments, one for each of said plurality of read/write heads, for storing data read by a corresponding one or said read/write heads from said rotating media.

25. The apparatus of claim 24 wherein said writing means includes:
- means responsive to the availability of a data communication path from said control module to said processor for excerpting said requested data from said one of said one track images stored in said buffer means; and means for transmitting said excerpted requested data to said processor via said available data communication path.

26. In a data processing system that includes a processor connected to a control module via a data channel, a plurality of data storage devices for accessing data stored on rotating media on which data is stored in tracks containing a plurality of data records, each having a beginning and an end, stored thereon, each of said data storage devices being interconnected with said control module and comprising:

a plurality of read/write heads;

a plurality of buffer means, each of which is connected to said bus and to a single one of said read/write heads, for storing the entire contents of data tracks read by one of said data storage device read/write heads from said rotating media; means, responsive to said processor transmitting a command to said control module requesting data stored on one of said tracks on one of said data storage devices, for writing said entire contents of said one track that contains said requested data into said buffer means, including:

means for detecting the beginning of a first one of said plurality of data records that appears on said one track subsequent to said processor transmitting said command;

means, responsive to said detecting means, for transferring said one track into said buffer means, from said detected beginning of said first detected record;

means, responsive to said control module establishing a data communication path from said control module to said processor, for excerpting said requested data from said one track stored in said buffer means, including:

means responsive to said transferring means for identifying the beginning of said requested data on said one track; and means for transmitting said excerpted requested data to said control module via said bus.

27. In a data processing system that includes a processor, one or more data storage devices interconnected with said processor via a corresponding control module and data channel, read/write head buffer apparatus for improving the data transfer performance of said data storage devices comprising:

a plurality of read/write heads; bus means connected to and interconnecting said control module and said plurality of read/write heads for transferring data therebetween;

a plurality of buffer means, each interposed between said bus means and a corresponding one of said plurality of read/write heads for storing data read from said rotating media by said read/write head;

means responsive to said processor requesting data stored on one of said data storage devices for writing an entire track image of one of said tracks of said rotating media that contains said requested data into one of said buffer means, including:

means responsive to the availability of a data communication path from said control module to said processor for excerpting said requested data from said entire track image of one track stored in said buffer means; and means for transmitting said excerpted requested data to said processor via said available data communication path.

* * * * *